US010597493B2

(12) United States Patent
Miyazaki et al.

(10) Patent No.: US 10,597,493 B2
(45) Date of Patent: Mar. 24, 2020

(54) POLYIMIDE PRECURSOR COMPOSITION AND METHOD OF PREPARING POLYIMIDE MOLDED ARTICLE

(71) Applicant: FUJI XEROX CO., LTD., Tokyo (JP)

(72) Inventors: Kana Miyazaki, Kanagawa (JP); Tsuyoshi Miyamoto, Kanagawa (JP); Tomoya Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/727,264

(22) Filed: Oct. 6, 2017

(65) Prior Publication Data

US 2018/0215873 A1 Aug. 2, 2018

(30) Foreign Application Priority Data

Jan. 27, 2017 (JP) ................................ 2017-013522

(51) Int. Cl.

*C08G 73/10* (2006.01)
*C09D 179/08* (2006.01)
*B29C 41/46* (2006.01)
*B29C 41/00* (2006.01)
*C08K 5/17* (2006.01)
*B29K 79/00* (2006.01)

(52) U.S. Cl.

CPC ........ *C08G 73/1071* (2013.01); *B29C 41/003* (2013.01); *B29C 41/46* (2013.01); *C08G 73/1017* (2013.01); *C08G 73/1032* (2013.01); *C08G 73/1067* (2013.01); *C08K 5/17* (2013.01); *C09D 179/08* (2013.01); *B29K 2079/08* (2013.01)

(58) Field of Classification Search

CPC ................ C08G 73/10; C08G 73/1071; C08G 73/1032; C09D 179/08; B29C 41/46; B29C 41/003; C08K 5/17; B29K 2079/08

See application file for complete search history.

(56) References Cited

U.S. PATENT DOCUMENTS

| | | | | |
|---|---|---|---|---|
| 4,238,528 | A | 12/1980 | Angelo et al. | |
| 5,719,253 | A | 2/1998 | Echigo et al. | |
| 6,531,568 | B1 * | 3/2003 | Shibuya | C08G 73/10 524/600 |
| 2013/0171520 | A1 * | 7/2013 | Nakayama | C08G 73/1067 429/211 |
| 2014/0213723 | A1 * | 7/2014 | Miyamoto | C08K 5/1575 524/754 |
| 2015/0212412 | A1 * | 7/2015 | Onishi | C08G 73/14 430/281.1 |
| 2016/0002407 | A1 * | 1/2016 | Wakita | C08G 73/106 257/40 |

FOREIGN PATENT DOCUMENTS

| | | | |
|---|---|---|---|
| JP | S63-231316 | A | 9/1988 |
| JP | H08-015519 | A | 1/1996 |
| JP | H08-59832 | A | 3/1996 |
| JP | H08-120077 | A | 5/1996 |
| JP | H08-157599 | A | 6/1996 |
| JP | 2003-013351 | A | 1/2003 |
| JP | 4057036 | B2 | 3/2008 |
| JP | 2012-036382 | A | 2/2012 |
| JP | 2014-202726 | A | 10/2014 |
| JP | 2014-210896 | A | 11/2014 |

OTHER PUBLICATIONS

Sroog, C.E., "Polymides," Journal of Polymer Science: Macromolecular Reviews, 1976, vol. 11, p. 164.

* cited by examiner

*Primary Examiner* — Shane Fang
(74) *Attorney, Agent, or Firm* — Oliff PLC

(57) ABSTRACT

A polyimide precursor composition includes a solvent including water and a polyimide precursor including a group having a triple bond at a terminal thereof, which is dissolved in the solvent.

10 Claims, No Drawings

POLYIMIDE PRECURSOR COMPOSITION AND METHOD OF PREPARING POLYIMIDE MOLDED ARTICLE

CROSS-REFERENCE TO RELATED APPLICATIONS

This application is based on and claims priority under 35 USC 119 from Japanese Patent Application No. 2017-013522 filed Jan. 27, 2017.

BACKGROUND

1. Technical Field

The present invention relates to a polyimide precursor composition and a method of preparing a polyimide molded article.

2. Related Art

A polyimide resin is a material having high durability and excellent heat resistance, and is widely used as an electronic material.

SUMMARY

According to an aspect of the invention, there is provided a polyimide precursor composition including a solvent including water and a polyimide precursor including a group having a triple bond at a terminal thereof, which is dissolved in the solvent.

DETAILED DESCRIPTION

Hereinafter, exemplary embodiments of the invention will be described in detail.

Polyimide Precursor Composition

A polyimide precursor composition according to an exemplary embodiment is a composition in which a polyimide precursor in which a group having a triple bond is provided at a terminal thereof (also referred to as "a specific polyimide precursor" below for convenience) is dissolved in a solvent including water (referred to as "an aqueous solvent" below). That is, the specific polyimide precursor is included in a composition, in a state of being dissolved in the aqueous solvent. "Dissolution" means a state where a residue of dissolved material is not visually recognized.

Here, in the related art, in a polyimide precursor composition in which a polyimide precursor in which at least one of a carboxy group and an amide group is provided at a terminal thereof is dissolved in an aqueous solvent, viscosity may be increased with the lapse of time and storage stability may be deteriorated.

On the contrary, if a polyimide precursor in which a group having a triple bond is provided at a terminal thereof is used as a polyimide precursor, solubility of the polyimide precursor in an aqueous solvent is increased and an increase of viscosity with the lapse of time is prevented.

Therefore, the polyimide precursor composition according to the exemplary embodiment has excellent storage stability. That is, regarding the polyimide precursor composition according to the exemplary embodiment, the increase of the viscosity is prevented and the polyimide precursor composition easily retains high film preparation properties even after the polyimide precursor composition is stored.

Thus, by molding a polyimide molded article with the polyimide precursor composition according to the exemplary embodiment, a polyimide molded article having excellent tensile breaking strength may be obtained.

The polyimide molded article obtained by molding with the polyimide precursor composition according to the exemplary embodiment also has improved various characteristics such as mechanical characteristic (tensile elongation at break and the like other than tensile breaking strength), heat resistance, an electrical characteristic, and solvent resistance. Further, since coating performance (coating stability) of the polyimide precursor composition is easily kept high, an occurrence of surface unevenness and pattern is prevented. Thus, surface smoothness is improved and variation in quality of a polyimide molded article is also prevented.

In the polyimide precursor composition according to the exemplary embodiment, dispersion of various fillers which are added for imparting various functions to the polyimide molded article is enhanced. Thus, the high functions are easily exhibited even with a small amount of the fillers. The reason is considered as follows. The group which includes a triple bond and is provided at the terminal of the specific polyimide precursor influences the filler to thereby improve dispersibility of the filler.

Here, when a polyimide precursor composition has any configuration of the followings 1) to 3) in order to form a polyimide precursor composition having high mechanical characteristics such as tensile breaking strength and tensile elongation at break, the viscosity of the polyimide precursor composition is likely to be increased with the lapse of time.

On the other hand, even when the polyimide precursor composition according to the exemplary embodiment has any configuration of the followings 1) to 3), the increase of the viscosity with the lapse of time is prevented and excellent storage stability is exhibited.

1) Configuration in which the content (solid content) of a polyimide precursor is increased (for example, configuration in which the content of the polyimide precursor is set to be from 10% by weight to 50% by weight with respect to the polyimide precursor composition).

2) Configuration in which the weight average molecular weight of the polyimide precursor is increased (for example, configuration in which the weight average molecular weight of the polyimide precursor is set to be from 50,000 to 200,000).

3) Configuration in which an aromatic polyimide precursor is used as the polyimide precursor (for example, configuration in which a condensation polymer which is a condensation polymer of an aromatic tetracarboxylic dianhydride and an aromatic diamine compound and has a terminal sealed by a compound which includes not only the group having a triple bond, but also a carboxy group or an amino group is used as the polyimide precursor).

Generally, in the case where the aromatic polyimide precursor (condensation polymer of an aromatic tetracarboxylic dianhydride and an aromatic diamine compound), there is a tendency of having difficulty in being dissolved in the aqueous solvent.

However, in the polyimide precursor composition according to the exemplary embodiment, since the group having a triple bond is provided at a terminal thereof, solubility of the specific polyimide precursor in the aqueous solvent is improved. Therefore, even in the case where an aromatic polyimide precursor is used as the specific polyimide precursor, the storage stability is excellent.

In the polyimide precursor composition according to the exemplary embodiment, an aqueous solvent including water is used as the solvent. Therefore, the polyimide precursor composition according to the exemplary embodiment has excellent environmental aptitude. When a polyimide molded article is molded by using the polyimide precursor composition according to the exemplary embodiment, a decrease of a heating temperature for distilling the solvent and reduction of a heating time are exhibited.

In the polyimide precursor according to the exemplary embodiment, it is preferable that an organic amine compound is further dissolved in the aqueous solvent.

If the organic amine compound is dissolved in the aqueous solvent, the specific polyimide precursor (carboxy group provided at a position other than the terminal thereof) turns into a state of becoming an amine salt by the organic amine compound, and thus solubility of the specific polyimide precursor in the aqueous solvent is further improved. Therefore, storage stability of the polyimide precursor composition is further improved.

In addition, if the organic amine compound is dissolved in the aqueous solvent, corrosion of a base as a ground when the polyimide molded article is molded is prevented. It is considered that the reason is because exhibition of acidity of the carboxy group in the specific polyimide precursor is prevented by basicity of the organic amine compound.

Hereinafter, components of the polyimide precursor composition according to this exemplary embodiment will be described.

Specific Polyimide Precursor

The specific polyimide precursor is a polyimide precursor in which a group having a triple bond is provided at a terminal thereof. Specifically, for example, the specific polyimide precursor is a resin (polyamic acid) having a repetitive unit represented by formula (I) and is a resin in which a group having a triple bond is provided at a terminal thereof.

The resin (polyamic acid) having a repetitive unit represented by formula (I) is not a low molecule compound and does not have a structure in which an interaction force between polymer chains is decreased by introducing a flexion chain, an aliphatic cyclic structure, and the like to a primary structure, so as to improve solubility in a solvent. In the resin, the solubility of the polyimide precursor in the aqueous solvent is improved by introducing the group having a triple bond to a terminal thereof. Therefore, depolymerization of a polyimide precursor shown in a method of improving solubility and deterioration of mechanical strength of a polyimide molded article, which may occur on changing a molecular structure of the polyimide precursor in a polyimide precursor resin in the related art, are not caused. In addition, water solubility of the polyimide precursor is improved.

(I)

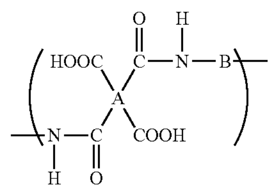

(In formula (I), A represents a tetravalent organic group and B represents a bivalent organic group.)

Here, in formula (I), the tetravalent organic group represented by A may be a residual group obtained by removing four carboxy groups from tetracarboxylic dianhydride which is a raw material.

The bivalent organic group represented by B may be a residual group obtained by removing two amino groups from a diamine compound which is a raw material.

That is, the specific polyimide precursor having a repetitive unit represented by formula (I) is a condensation polymer of the tetracarboxylic dianhydride and the diamine compound.

The tetracarboxylic dianhydride may be an aromatic compound or an aliphatic compound, and however, the aromatic compound is preferably used as the tetracarboxylic dianhydride. That is, a tetravalent organic group represented by A in formula (I) is preferably an aromatic organic group.

Examples of the aromatic tetracarboxylic dianhydride include pyromelletic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyl-diphenyl silane tetracarboxylic dianhydride, 3,3',4,4'-tetra phenylsilane tetracarboxylic dianhydride, 1,2,3,4-furan tetracarboxylic dianhydride, 4,4'-bis(3,4-dicarboxy phenoxy)diphenyl sulfide dianhydride, 4,4'-bis(3,4-dicarboxy phenoxy)diphenylsulfonedianhydride, 4,4'-bis(3,4-dicarboxy phenoxy)diphenyl propane dianhydride, 3,3',4,4'-perfluoro isopropylidenediphthalic dianhydride, 3,3',4,4'-biphenyl tetracarboxylic dianhydride, 2,3,3',4'-biphenyl tetracarboxylic dianhydride, bis(phthalic acid)phenylphosphine oxide dianhydride, p-phenylene-bis(triphenyl phthalic acid)dianhydride, m-phenylene-bis(triphenyl phthalic acid)dianhydride, bis(triphenyl phthalic acid)-4,4'-diphenyl ether dianhydride, bis(triphenyl phthalic acid)-4,4'-diphenylmethane dianhydride.

Examples of aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxy cyclopentyl acetic dianhydride, 3,5,6-tricarboxy norbornane-2-acetic acid dianhydride, 2,3,4,5-tetrahydrofuran tetracarboxylic dianhydride, 5-(2,5-di-oxo-tetrahydrofuryl)-3-methyl-3-cyclohexene-1,2-dicarboxylic acid dianhydride, bicyclo[2,2,2]-oct-7-ene-2,3,5,6-tetracarboxylic dianhydride; aliphatic tetracarboxylic dianhydride having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these substances, an aromatic tetracarboxylic dianhydride may be used as tetracarboxylic dianhydride. Specifically, for example, pyromelletic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, and 3,3',4,4'-benzophenone tetracarboxylic dianhydride may be used. Pyromelletic dianhydride, 3,3',4,4'-biphenyl tetracarboxylic dianhydride, and 3,3',4,4'-benzophenone tetracarboxylic dianhydride may be further used. 3,3',4,4'-biphenyl tetracarboxylic dianhydride may be particularly used.

One type of tetracarboxylic dianhydride may be used singly or combination of two or more types of tetracarboxylic dianhydride may be used together.

When combination of two or more types of tetracarboxylic dianhydride is used together, an aromatic tetracarboxylic dianhydride or an aliphatic tetracarboxylic dianhydride may be used, or an aromatic tetracarboxylic dianhydride and an aliphatic tetracarboxylic dianhydride may be used in combination.

The diamine compound is a diamine compound having two amino groups in a molecular structure, and may be aromatic or aliphatic. However, an aromatic compound may be preferably used. That is, the bivalent organic group represented by B in formula (I) may be an aromatic organic group.

Examples of the diamine compound include an aromatic diamine such as p-phenylenediamine, m-phenylenediamine, 4,4'-diaminodiphenylmethane, 4,4'-diaminodiphenyl ethane, 4,4'-diaminodiphenyl ether, 4,4'-diaminodiphenyl sulfide, 4,4'-diamino-diphenyl sulfone, 1,5-diamino-naphthalene, 3,3-dimethyl-4,4'-diamino biphenyl, 5-amino-1-(4'-amino phenyl)-1,3,3-trimethyl-indane, 6-amino-1-(4'-amino phenyl)-1,3,3-trimethyl-indane, 4,4'-diamino benzanilide, 3,5-diamino-3'-trifluoromethyl benzanilide, 3,5-diamino-4'-trifluoromethyl benzanilide, 3,4'-diaminodiphenyl ether, 2,7-diamino-fluorene, 2,2-bis(4-aminophenyl) hexafluoropropane, 4,4'-methylene-bis(2-chloroaniline), 2,2',5,5'-tetrachloro-4,4'-diamino biphenyl, 2,2'-dichloro-4,4'-diamino-5,5'-dimethoxy biphenyl, 3,3'-dimethoxy-4,4'-diamino biphenyl, 4,4'-diamino-2,2'-bis(trifluoromethyl) biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene) bisaniline, 4,4'-(m-phenylene isopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamine such as diaminotetraphenyl thiophene, which has two amino groups bonded to an aromatic ring and hetero atoms other than a nitrogen atom of the amino group; aliphatic diamine and alicyclic diamine such as 1,1-metaxylylene diamine, 1,3-propane diamine, tetramethylene diamine, pentamethylene diamine, octamethylene diamine, nonamethylene diamine, 4,4-diamino heptamethylene diamine, 1,4-diamino cyclohexane, isophorone diamine, tetrahydrodicyclopentadienylene diamine, hexahydro-4,7-metanoindanylene dimethylene diamine, and trycyclo[6,2,1,$0^{2.7}$]-undecylene dimethyl diamine, and 4,4'-methylenebis(cyclohexylamine).

Among these substances, the aromatic diamine compound may be used as the diamine compound. Specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone may be used. 4,4'-diaminodiphenyl ether and p-phenylenediamine may be particularly used.

One of the diamine compounds may be used singly or two or more of the diamine compounds may be used in combination. When two or more of the diamine compounds are used in combination, two or more of the aromatic diamine compounds or two or more of the aliphatic diamine compounds may be used, or the aromatic diamine compound and the aliphatic diamine compound may be used in combination.

The specific polyimide precursor may be a resin having an imidization rate of 0.2 or less. That is, the specific polyimide precursor may be a resin being partially imidized.

Specific examples of the specific polyimide precursor include a resin having repetitive units represented by formula (I-1), formula (I-2), and formula (I-3).

(I-1)

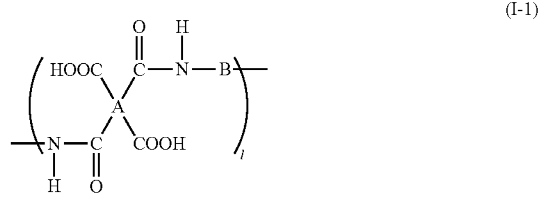

(I-2)

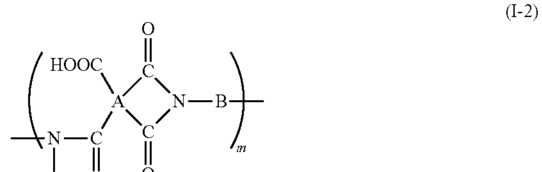

(I-3)

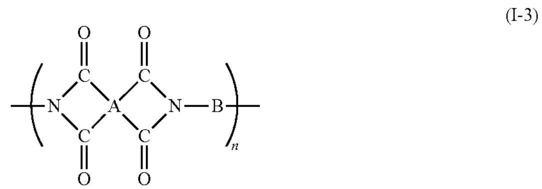

In the formula (I-1), the formula (I-2), and the formula (I-3), A represents a tetravalent organic group and B represents a bivalent organic group. A and B have the same meanings as those of A and B in formula (I), respectively.

l represents an integer of 1 or greater. m and n each represent an integer of 0 or greater. l, m, and n satisfy a relationship of $(2n+m)/(2l+2m+2n) \leq 0.2$.

In formulas (I-1) to (I-3), l represents an integer of 1 or greater, preferably an integer of 1 to 200, and more preferably an integer of 1 to 100. m and n each represent an integer of 0 or greater, preferably from 0 to 200, and more preferably from 0 to 100.

l, m, and n satisfy a relationship of $(2n+m)/(2l+2m+2n) \leq 0.2$, preferably satisfy a relationship of $(2n+m)/(2l+2m+2n) \leq 0.15$, and more preferably satisfy a relationship of $(2n+m)/(2l+2m+2n) \leq 0.10$.

Here, "(2n+m)/(2l+2m+2n)" represents a ratio of the number of bonding parts (2n+m) subjected to imide ring closure, to the number of all bonding parts (2l+2m+2n) among bonding parts (reaction parts of tetracarboxylic dianhydride and the diamine compound) of the specific polyimide precursor. That is, "(2n+m)/(2l+2m+2n)" represents an imidization rate of the specific polyimide precursor.

Accordingly, if the imidization rate (value of "(2n+m)/(2l+2m+2n)") of the specific polyimide precursor is set to 0.2 or less (preferably 0.15 or less and more preferably 0.10 or less), gelling or precipitating and separating of the specific polyimide precursor is prevented.

The imidization rate (value of "(2n+m)/(2l+2m+2n)") of the specific polyimide precursor is measured by the following method.

Measurement of Imidization Rate of Polyimide Precursor

Preparation of Polyimide Precursor Sample (i) A silicone wafer is coated with a polyimide precursor composition to be measured so as to have a film thickness of a range of 1 μm to 10 μm, thereby preparing a coated film sample.

(ii) The coated film sample is immersed in tetrahydrofuran (THF) for 20 minutes and a solvent in the coated film sample is exchanged with tetrahydrofuran (THF). The immersed solvent is not limited to THF. A solvent which does not dissolve the polyimide precursor and may be mixed with a solvent component included in the polyimide precursor composition may be selected. Specifically, an alcohol solvent such as methanol and ethanol, and an ether compound such as dioxane may be used.

(iii) The coated film sample is taken out from THF, and THF adhering to the surface of the coated film sample is removed by spraying $N_2$ gas to the THF. The coated film sample is dried by performing treatment under reduced pressure of 10 mmHg or smaller at a temperature range of 5° C. to 25° C. for 12 hours or longer, and thereby a polyimide precursor sample is prepared.

Preparation of 100% Imidized Standard Sample (iv) Similarly to the (i), a silicone wafer is coated with a polyimide precursor composition to be measured and thereby a coated film sample is prepared.

(v) An imidization reaction is performed by heating the coated film sample at 380° C. for 60 minutes, and thereby a 100% imidized standard sample is prepared.

Measurement and Analysis (Measurement Example and Analysis Example of Polyimide Precursor Sample formed of 4,4'-diaminodiphenyl ether and 3,3',4,4'-biphenyl tetracarboxylic dianhydride)

(vi) Infrared absorption spectra of the 100% imidized standard sample and the polyimide precursor sample are measured by a Fourier transform infrared spectrophotometer (FT-730 manufactured by HORIBA, Ltd.). A ratio I' (100) of an absorption peak (Ab' (1780 $cm^{-1}$)) derived from imide bonds in the vicinity of 1780 $cm^{-1}$ to an absorption peak (Ab' (1500 $cm^{-1}$)) derived from an aromatic ring in the vicinity of 1500 $cm^{-1}$ of the 100% imidized standard sample is obtained.

(vii) The polyimide precursor sample is measured in a similar manner, and thus a ratio I(x) of an absorption peak (Ab (1780 $cm^{-1}$)) derived from imide bonds in the vicinity of 1780 $cm^{-1}$ to an absorption peak (Ab(1500 $cm^{-1}$)) derived from an aromatic ring in the vicinity of 1500 $cm^{-1}$ is obtained.

An imidization rate of the polyimide precursor is calculated based on the following expressions by using the measured ratios I' (100) and I(x).

$$\text{imidization rate of polyimide precursor } I(x)/I'(100) \qquad \text{Expression:}$$

$$I'(100)=(Ab'(1780\ cm^{-1}))/(Ab'(1500\ cm^{-1})) \qquad \text{Expression:}$$

$$I(x)=(Ab(1780\ cm^{-1}))/(Ab(1500\ cm^{-1})) \qquad \text{Expression:}$$

Measurement of the imidization rate of this polyimide precursor is applied to measurement of an imidization rate of an aromatic polyimide precursor. When an imidization rate of an aliphatic polyimide precursor is measured, a peak derived from a structure which is not changed before and after the imidization reaction is used as an internal standard peak, instead of an absorption peak of the aromatic ring.

Ratio of Tetracarboxylic Dianhydride and Diamine Compound

In the specific polyimide precursor, the molar equivalent number of the diamine compound is preferably greater than the molar equivalent number of tetracarboxylic dianhydride. If this relation is satisfied, storage stability is easily improved. In addition, mechanical strength of a polyimide molded article is also easily improved.

The molar equivalent of the diamine compound used during a polymerization reaction is set excessive with respect to the molar equivalent of tetracarboxylic dianhydride in order to realize the above relation. The ratio between the molar equivalents of the diamine compound and the tetracarboxylic dianhydride is a value of the molar equivalent of the diamine compound taking the molar equivalent of tetracarboxylic dianhydride as 1. This ratio is preferably from 1.0001 to 1.2000, and more preferably from 1.0010 to 1.2000.

If the ratio between the molar equivalents of the diamine compound and the tetracarboxylic dianhydride is equal to or greater than 1.0001, when the content ratio of the number of the group having a triple bond to the number of all the terminals is smaller than 100 mol %, an amino group is provided as a terminal group other than the group having a triple bond, at a molecular terminal. Therefore, dispersibility of the specific polyimide precursor is improved and storage stability is easily improved, by an action of the amino group at the molecular terminal, as compared with the case where a carboxy group is provided at the molecular terminal. In addition, film preparation properties of a polyimide precursor composition are easily improved. Mechanical strength of a polyimide molded article is easily improved. Further, dispersion of various fillers added for applying various functions to the polyimide molded article is enhanced, and the high function is easily expressed even when the filler is used in a small amount, as compared with the case where a carboxy group is provided at the molecular terminal. If the ratio for the molar equivalent is equal to or smaller than 1.2000, the molecular weight of the polyimide precursor is easily increased. For example, when a film-shaped polyimide molded article is used, film strength (tensile breaking strength and tensile elongation at break) of the film-shaped polyimide molded article is easily obtained.

Here, the molar equivalent of the diamine compound and the molar equivalent of tetracarboxylic dianhydride in the specific polyimide precursor are measured as follows. The specific polyimide precursor resin is decomposed into a diamine compound and a tetracarboxylic acid salt by performing hydrolysis treatment in a basic aqueous solution such as sodium hydroxide and potassium hydroxide. The obtained sample is analyzed according to gas chromatography or liquid chromatography, and thus a ratio of tetracarboxylic dianhydride and the diamine compound constituting the specific polyimide precursor is determined.

Terminal Structure of Polyimide Precursor

The group having a triple bond is provided at a terminal (that is, a molecular terminal) of the specific polyimide precursor.

As a method of introducing the group having a triple bond to a terminal of the specific polyimide precursor, a method of sealing a terminal of a condensation polymer of tetracarboxylic dianhydride and a diamine compound with a compound having not only a group having a triple bond but also a carboxy group or an amino group is exemplified. That is, a condensation polymer which is a condensation polymer of tetracarboxylic dianhydride (preferably aromatic tetracarboxylic dianhydride) and a diamine compound (preferably aromatic diamine compound) and has a terminal sealed by a compound having not only the group having a triple bond but also a carboxy group or an amino group is exemplified as the specific polyimide precursor.

Here, the compound which has not only the group having a triple bond but also a carboxy group or an amino group (also referred to as "an acetylene compound" below) may have plural groups having the triple bonds or may have plural carboxy groups or plural amino groups. The plural carboxy groups may be subjected to anhydride.

As the group having a triple bond, an alkynyl group (alkynyl group having 2 to 10 carbon atoms, such as an ethynyl group (acetylene group), a propynyl group, and a phenylethynyl group) is exemplified.

As the acetylene compound, dicarboxylic anhydride which includes the group having a triple bond and a monoamine compound which includes the group having a triple bond are exemplified.

As the dicarboxylic anhydride which includes the group having a triple bond, ethynylphthalic anhydride, propynylphthalic anhydride, and phenylethynyl phthalic anhydride are exemplified.

As the monoamine compound which includes the group having a triple bond, ethynylamine, ethynylaniline, propynylaniline, and phenylethynylaniline are exemplified.

Among the substances, from a viewpoint of the storage stability, dicarboxylic anhydride which includes the group having a triple bond and a monoamine compound which includes the group having a triple bond are preferable as the acetylene compound. Ethynylphthalic anhydride, ethynylamine, and ethynylaniline are more preferable.

Regarding introduction of the group having a triple bond to the terminal of the specific polyimide precursor, in the case where the molar equivalent of the diamine compound is greater than the molar equivalent of the tetracarboxylic dianhydride in performing condensation polymerization of a tetracarboxylic dianhydride and a diamine compound, the compound which includes the group having a triple bond and a carboxy group is used as the acetylene compound. In the case where the molar equivalent of the tetracarboxylic dianhydride is greater than the molar equivalent of the diamine compound, the compound which includes the group having a triple bond and an amino group is used as the acetylene compound.

The ratio (also referred to as "the quantity of the terminal acetylene group) of the number of the group having a triple bond to the number of all of the terminals in the specific polyimide precursor is preferably from 90 mol % to 100 mol %, and more preferably from 95 mol % to 100 mol %.

If the quantity of the terminal acetylene group is in the above range, the storage stability is easily improved.

The quantity of the terminal acetylene group is measured by quantification of a nuclear magnetic resonance (NMR) method. Specifically, the quantity of the terminal acetylene group is measured as follows.

When a molar ratio (terminal acetylene group/specific polyimide precursor) between the terminal acetylene group and the specific polyimide precursor, which is measured by NMR, is designated as a sealing ratio A (mol %), a weight ratio thereof (that is, quantity of the terminal acetylene group) X is represented by the following expression.

$$X=[2\times M_{(X)}\times A/100]/M_{(PAA)}$$

In the expression, $M_{(X)}$ represents a molecular weight of the terminal acetylene group, $M_{(PAA)}$ represents a molecular weight (value of the number average molecular weight of GPC) of the specific polyimide precursor, and A represents a sealing ratio (mol %).

Weight Average Molecular Weight of Polyimide Precursor

The weight average molecular weight of the specific polyimide precursor may be from 2,000 to 200,000, preferably is from 50,000 to 200,000, more preferably from 5,000 to 100,000, and particularly preferably from 10,000 to 70,000.

In particular, even though the weight average molecular weight of the specific polyimide precursor is increased to be from 50,000 to 200,000 in order to form a polyimide precursor composition having high mechanical characteristics such as tensile breaking strength and tensile elongation at break, the storage stability is improved.

The ratio between the molar equivalents of the tetracarboxylic dianhydride and the diamine compound is adjusted such that a polyimide precursor having a desired weight average molecular weight is obtained.

The weight average molecular weight of the specific polyimide precursor is measured according to a gel permeation chromatography (GPC) method under the following measurement conditions.

Column: TSKgelα-M manufactured by Tosoh Corporation (7.8 mm I.D×30 cm)

Eluent: DMF (dimethylformamide)/30 mM LiBr/60 mM phosphoric acid

Flow speed: 0.6 mL/min

Injection volume: 60 μL

Detector: RI (differential refractive index detector)

A content (concentration) of the polyimide precursor may be from 0.1% by weight to 50% by weight with respect to the polyimide precursor composition, preferably from 0.5% by weight to 25% by weight, and more preferably from 1% by weight to 20% by weight.

In particular, even though the content of the polyimide precursor is increased to be from 10% by weight to 50% by weight with respect to the polyimide precursor composition in order to form a polyimide precursor composition being high in mechanical characteristics such as tensile breaking strength and tensile elongation at break, the storage stability is improved.

Organic Amine Compound

The organic amine compound is a compound that improves solubility of the specific polyimide precursor in the solvent by causing the specific polyimide precursor (carboxy group thereof) to become an amine salt and functions as an imidization accelerator. The organic amine compound is a surface-inactive amine compound which does not have surface activity. Specifically, the organic amine compound may be an amine compound having a molecular weight which is equal to or smaller than 170. The organic amine compound may be a compound except for the diamine compound which is the raw material of the polyimide precursor.

The organic amine compound may be a water-soluble compound. Here, "water solubility" means that 1% by weight or greater of a target substance is dissolved in water at 25° C.

As the organic amine compound, a primary amine compound, a secondary amine compound, and a tertiary amine compound are exemplified.

Among the compounds, at least one (particularly, tertiary amine compound) selected from the secondary amine compound and the tertiary amine compound may be used as the organic amine compound. When the tertiary amine compound or the secondary amine compound (particularly, tertiary amine compound) is used as the organic amine compound, solubility of the specific polyimide precursor in the solvent is improved and the storage stability of the polyimide precursor composition is easily improved.

A bivalent or higher polyvalent amine compound in addition to a monovalent amine compound is also exemplified as the organic amine compound. If the bivalent or higher polyvalent amine compound is used, a pseudo-crosslinking structure is easily formed between molecules of the specific polyimide precursor, and the storage stability of the polyimide precursor composition is easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino) ethanol, and morpholine.

Examples of the tertiary amine compound include 2-dimethyl aminoethanol, 2-diethyl aminoethanol, 2-dimethyl aminopropanol, triethylamine, picoline, methylmorpholine, and ethylmorpholine.

Here, from a viewpoint of the storage stability, an amine compound (particularly, tertiary amine compound) having a heterocyclic structure which contains nitrogen is also preferable as the organic amine compound. Examples of the amine compound having a heterocyclic structure which contains nitrogen (referred to as "a nitrogen-containing heterocyclic amine compound" below) include isoquinolines (amine compound having an isoquinoline skeleton), pyridines (amine compound having a pyridine skeleton), pyrimidines (amine compound having a pyrimidine skeleton), pyrazines (amine compound having a pyrazine skeleton), piperazines (amine compound having a piperazine skeleton), triazines (amine compound having a triazine skeleton), imidazoles (amine compound having an imidazole skeleton), polyaniline, polypyridine, and polyamine.

As the organic amine compound, from a viewpoint of the storage stability, at least one selected from the group consisting of morpholines, amino alcohols, and imidazoles is preferable, and at least one selected from the group consisting of N-methylmorpholine, N-ethylmorpholine, and dimethylaminoethanol is more preferable.

Among the above substances, a compound having a boiling point which is equal to or higher than 60° C. (preferably from 60° C. to 200° C. and more preferably from 70° C. to 150° C.) may be used as the organic amine compound. If the boiling point of the organic amine compound is set to be equal to or higher than 60° C., an occurrence of a situation in which the organic amine compound is volatilized from the polyimide precursor composition when being stored is prevented. In addition, deterioration of solubility of the specific polyimide precursor in the solvent is easily prevented.

The content of the organic amine compound may be from 30 mol % to 200 mol % (preferably from 50 mol % to 150 mol %, and more preferably from 80 mol % to 120 mol %) with respect to a carboxy group (—COOH) of the polyimide precursor in the polyimide precursor composition. If the content of the organic amine compound is set to be equal to or greater than 50 mol %, the polyimide precursor is easily dissolved in the aqueous solvent. If the content of the organic amine compound is set to be equal to or smaller than 200 mol %, stability of the organic amine compound in the solution is easily ensured and an unpleasant odor is also prevented.

One type of the organic amine compound may be singly used or combination of two types thereof may be used.

Aqueous Solvent

The aqueous solvent is a solvent including water. Specifically, the aqueous solvent may be a solvent which includes 10% by weight or greater of water with respect to the entirety of the aqueous solvent. Here, "water solubility" means that 1% by weight or greater of a target substance is dissolved in water at 25° C.

Examples of water include distilled water, ion exchange water, ultrafiltration water, and pure water.

The content of water is preferably from 50% by weight to 100% by weight, more preferably from 70% by weight to 100% by weight, further preferably from 80% by weight to 100% by weight, and particularly preferably from 90% by weight to 100% by weight, with respect to the entirety of the aqueous solvent. It is most preferable that the aqueous solvent does not include a solvent other than water.

In the case where the aqueous solvent includes a solvent other than water, examples of the solvent other than water include a water-soluble organic solvent and an aprotic polar solvent. From a viewpoint of transparency, mechanical strength of a polyimide molded article, the water-soluble organic solvent is preferable as the solvent other than water. In particular, from a viewpoint of improving various characteristics of a polyimide molded article, such as heat resistance, an electrical characteristic, and solvent resistance in addition to mechanical strength, it is preferable that the aqueous solvent does not include an aprotic polar solvent or includes an aprotic polar solvent in a small amount (for example, 10% by weight or smaller with respect to the entirety of a water-soluble solvent).

Examples of the water-soluble organic solvent include a water-soluble ether solvent, a water-soluble ketone solvent, and a water-soluble alcohol solvent.

One type of the water-soluble organic solvent may be singly used. However, in the case where combination of two types thereof is used, examples of the combination include combination of a water-soluble ether solvent and a water-soluble alcohol solvent, combination of a water-soluble ketone solvent and a water-soluble alcohol solvent, and combination of a water-soluble ether solvent, a water-soluble ketone solvent, and a water-soluble alcohol solvent.

The water-soluble ether solvent is a water-soluble solvent which has an ether bond in one molecule. Examples of the water-soluble ether solvent include tetrahydrofuran (THF), dioxane, trioxane, 1,2-dimethoxyethane, diethylene glycol dimethyl ether, and diethylene glycol diethyl ether. Among the above substances, tetrahydrofuran and dioxane are preferable as the water-soluble ether solvent.

The water-soluble ketone solvent is a water-soluble solvent which has a ketone group in one molecule. Examples of the water-soluble ketone solvent include acetone, methyl ethyl ketone, and cyclohexanone. Among the above substances, acetone is preferable as the water-soluble ketone solvent.

The water-soluble alcohol solvent is a water-soluble solvent which has an alcoholic hydroxyl group in one molecule. Examples of the water-soluble alcohol solvent include methanol, ethanol, 1-propanol, 2-propanol, tert-butyl alcohol, ethylene glycol, monoalkyl ether of ethylene glycol, propylene glycol, monoalkyl ether of propylene glycol, diethylene glycol, monoalkyl ether of diethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among the above substances, methanol, ethanol, 2-propanol, ethylene glycol, monoalkyl ether of ethylene glycol, propylene glycol, monoalkyl ether of propylene glycol, diethylene glycol, and monoalkyl ether of diethylene glycol are preferable as the water-soluble alcohol solvent.

The aprotic polar solvent is a solvent which has a boiling point of 150° C. to 300° C. and a dipole moment of 3.0 D to 5.0 D. Specific examples of the aprotic polar solvent include N-methyl-2-pyrrolidone (NMP), N,N-dimethylformamide (DMF), N,N-dimethylacetamide (DMAc), dimethyl sulfoxide (DMSO), hexamethylenephosphoramide (HMPA), N-methyl caprolactam, and N-acetyl-2-pyrrolidone.

In the case where the solvent other than water is contained as the aqueous solvent, a solvent which is used together may have a boiling point which is equal to or lower than 250° C., preferably from 60° C. to 200° C., and more preferably from 80° C. to 150° C. When the boiling point of the solvent used together is set to be in the above range, the solvent other than water is unlikely to remain on a polyimide molded article and a polyimide molded article having high mechanical strength is easily obtained.

Other Additives

The polyimide precursor composition according to the exemplary embodiment may include various fillers for imparting various functions such as conductivity and mechanical strength to a polyimide molded article prepared by the polyimide precursor composition. Furthermore, the polyimide precursor composition may include a catalyst for accelerating the imidization reaction, a leveling material for improving quality of a prepared film, or the like.

Example of a conductive material which is added for imparting conductivity include a material being conductive (for example, volume resistivity being less than $10^7$ Ω·cm, this is hereinafter applied) or a material being semiconductive (for example, volume resistivity being from $10^7$ Ω·cm to $10^{13}$ Ω·cm, this is hereinafter applied). These conductive materials are selected in accordance with a use purpose.

Example of the conductive material include carbon black (for example, acidic carbon black being equal to or less than pH 5.0), metal (for example, aluminum, and nickel), metal oxide (for example, yttrium oxide, and tin oxide), anion conductive material (for example, potassium titanate, and LiCl), and a conductive polymer (for example, polyaniline, polypyrrole, polysulfone, and polyacetylene).

One of the conductive material may be singly used or two or more thereof may be used in combination.

When the conductive material has a particle shape, the conductive material may be particles preferably having a primary particle size of less than 10 μm, and more preferably having a primary particle size of 1 μm or less.

Examples of the filler which is added for improving the mechanical strength includes a particle-shaped material such as silica powder, alumina powder, barium sulfate powder, titanium oxide powder, mica, and talc. Furthermore, powder of a fluorine resin such as polytetrafluoro ethylene (PTFE) and tetrafluoroethylene perfluoroalkyl vinyl ether copolymer (PFA) may be added for improving water repellency and release properties on the surface of the polyimide molded article.

As the catalyst for accelerating the imidization reaction, a dehydrating agent, such as acidic anhydride, and an acidic catalyst such as a phenol derivative, a sulfonic acid derivative, and a benzoic acid derivative, may be used.

The content of the other additives may be selected in accordance with a use purpose of the prepared polyimide molded article.

Preparing Method of Polyimide Precursor Composition

A preparing method of the polyimide precursor composition according to the exemplary embodiment is not particularly limited. For example, a tetracarboxylic dianhydride, a diamine compound, and an acetylene compound are polymerized in an aqueous solvent including water, so as to prepare a specific polyimide precursor in which the group having a triple bond is provided at a terminal thereof.

In the preparing method of the polyimide precursor composition according to the exemplary embodiment, it is preferable that the specific polyimide precursor is produced in the presence of an organic amine compound.

In the preparing method described herein, if necessary, a process of substituting a solvent or changing a solvent composition may be provided after the polymerization process.

Polyimide Molded Article and Preparing Method Thereof

The preparing method of a polyimide molded article according to the exemplary embodiment is a preparing method which includes subjecting the polyimide precursor composition according to the exemplary embodiment (also hereinafter referred to as "a specific polyimide precursor composition") to a heat treatment to perform molding.

Specifically, the preparing method of a polyimide molded article according to the exemplary embodiment includes, for example, a process of forming a coated film by applying the specific polyimide precursor composition onto a coating target (referred to as "a coated-film forming process" below) and a process of forming a polyimide resin layer by heating the coated film (referred to as "a heating process" below).

Coated-film Forming Process

Firstly, a coating target (an object to be coated with the specific polyimide precursor composition) is prepared. The coating target is selected in accordance with the use purpose of a polyimide molded article to be prepared.

Specifically, in the case where a liquid crystal alignment film is prepared as the polyimide molded article, various substrates to be applied to a liquid crystal element are exemplified as the coating target. For example, a silicon substrate, a glass substrate, and a substrate in which a metal or metal alloy film is formed on a surface of each of the forgoing substrates are exemplified.

In the case where a passivation film is prepared as the polyimide molded article, for example, the coating target is selected from a semiconductor substrate on which an integrated circuit is formed, a wiring substrate on which wiring is formed, a printed board on which an electronic component and a wiring are provided, and the like.

In the case where a wire shell material is prepared as the polyimide molded article, for example, various wires (wire material, bar material, or plate material made of metal or alloys such as soft copper, hard copper, oxygen-free copper, chromium ore, and aluminum) are exemplified as the coating target. In the case where the polyimide molded article is formed and processed so as to have a tape shape and is used as a wire shell material which has a tape shape and is used for being wound around a wire, various flat substrates or various cylindrical substrates are used as the coating target.

In the case where an adhesive film is prepared as the polyimide molded article, for example, various molded articles which function as an adhering target (for example, various electrical components such as a semiconductor chip and a printed board) are exemplified.

Then, the desired coating target is coated with the specific polyimide precursor composition, thereby forming a coated film of the specific polyimide precursor composition.

A coating method of the specific polyimide precursor composition is not particularly limited. For example, various coating methods such as spray coating, a spin coating method, a roll coating method, a bar coating method, a slit die coating method, and an ink jet coating method are exemplified.

Heating Process

Then, drying is performed on the coated film of the specific polyimide precursor composition. A dry film (dried coated film before imidization) is formed by this drying treatment.

Regarding a heating condition for the drying treatment, the drying treatment may be performed, for example, at a temperature of 80° C. to 200° C. for a period of 10 minutes to 60 minutes. As the temperature is increased, a heating time may be reduced. Exposure to hot wind is effective in the heating. In the heating, the temperature may be slowly increased or may be increased without changing a speed thereof.

Then, an imidization treatment is performed on the dry film. Thus, a polyimide resin layer is formed.

Heating conditions of the imidization treatment are a temperature of 150° C. to 400° C. (preferably 200° C. to 300° C.) and a period of time of 20 minutes to 60 minutes, for example. Heating under the above heating conditions causes the imidization reaction, and thereby a polyimide resin layer is formed. Before the temperature reaches the final temperature in heating process, heating may be performed at the temperature which is increased stepwise or is slowly increased at a constant speed, during a heating reaction.

A polyimide molded article is formed through the above-described processes. If necessary, the polyimide molded article is detached from the coating target, and post-processing is performed.

Polyimide Molded Article

The polyimide molded article according to the exemplary embodiment is a polyimide molded article obtained by the preparing method of a polyimide molded article according to the exemplary embodiment. Examples of the polyimide molded article include various polyimide molded articles such as a liquid crystal alignment film, a passivation film, a wire shell material, and an adhesive film. In addition, examples of the polyimide molded article include a flexible electronic substrate film, a copper-clad laminated film, a laminated film, an electric insulation film, a porous film for a fuel cell, a separation film, a heat-resistant coated film, an IC package, a resist film, a flattening film, a microlens array film, and an optical-fiber shell film.

As the polyimide molded article, a belt member is also exemplified. As the belt member, a driving belt, a belt (for example, an intermediate belt, a transfer belt, a fixation belt, and a transporting transfer belt) for an electrophotographic image forming apparatus, and the like are exemplified.

That is, the preparing method of the polyimide molded article according to the exemplary embodiment may be applied as a preparing method of various polyimide molded articles described above.

An aqueous solvent included in the polyimide precursor composition is contained in the polyimide molded article according to the exemplary embodiment.

The content of the aqueous solvent contained in the polyimide molded article according to the exemplary embodiment is 1 ppb or more and less than 1% with respect to the polyimide molded article. The quantity of the aqueous solvent contained in the polyimide molded article is determined in such a manner that a volume of a gas generated by heating the polyimide molded article is determined according to a gas chromatography method. The quantity of the organic amine compound included in the polyimide molded article is also determined in such a manner that a volume of a gas generated by heating the polyimide molded article is determined according to a gas chromatography method.

EXAMPLES

Hereinafter, examples will be described. However, the exemplary embodiment of the invention is not limited to these examples. In the following descriptions, all of "part" and "%" are based on a weight basis, unless otherwise indicated.

Underwater Polymerization Method

Example 1

Underwater Polymerization Method

Preparation of Polyimide Precursor Composition (A-1)

Polymerization Process

A flask equipped with a stirring rod, a thermometer, and a dripping funnel is filled with 308 g of water as the aqueous solvent. 21.44 g (198.26 mmol) of p-phenylenediamine (PDA: molecular weight of 108.14) as the diamine compound, 70.00 g (237.92 mmol) of 3,3',4,4'-biphenyl tetracarboxylic dianhydride (BPDA: molecular weight of 294.22) as tetracarboxylic dianhydride, and 9.29 g (79.31 mmol) of 3-ethynylaniline as the acetylene compound are added to the flask. Then, the substances are dispersed by performing stirring at 20° C. for 10 minutes. 48.13 g (475.83 mmol) of methyl morpholine (described as MMO below: organic amine compound) as the organic amine compound are added. Further, dissolution and a reaction are performed by performing stirring for 24 hours while the flask is held at a reaction temperature of 50° C. Thus, a polyimide precursor composition (A-1) is obtained.

After the storage stability of the obtained polyimide precursor composition is evaluated, a film is prepared by using the polyimide precursor composition, and film preparation properties of the prepared film are evaluated. The evaluation results are shown in Table 1 below.

Here, regarding the polyimide precursor composition (A-1) just after being prepared, the quantity of the terminal acetylene group of a polyimide precursor, a solid content of the polyimide precursor (PI precursor), an imidization rate of the polyimide precursor, the molecular weight (weight average molecular weight Mw) of the polyimide precursor (PI precursor), a solid content as polyimide (polyimide solid content), a liquid state of the composition, and viscosity of the composition are measured.

The imidization rate of the produced polyimide precursor is 0.02. The quantity of the terminal acetylene groups of the polyimide precursor is measured as described above. As a result, the polyimide precursor has acetylene groups at all the terminals.

Various measurement methods (measurement method other than the methods described above) are as follows.

Viscosity Measuring Method

Viscosity is measured under the following conditions by means of an E type viscometer.

Measuring device: E type rotation viscometer TV-20H (Toki Sangyo Co., Ltd)

Measurement probe: No. 3 type rotor 3°×R14

Measurement temperature: 22° C.

Measurement Method of Polyimide Solid Content (PI Solid Content)

A polyimide solid content is measured under the following conditions by using a differential heat-thermogravimetry simultaneous measurement device. The measured value at 380° C. is denoted as a polyimide solid content.

Measuring device: differential heat-thermogravimetry simultaneous measurement device TG/DTA6200 (Seiko Instruments Inc.)

Measurement range: from 20° C. to 400° C.

Temperature rising speed: 20° C./minute

Evaluation

The storage stability of the obtained polyimide precursor composition (A-1) is evaluated. Film preparing is performed by using the obtained polyimide precursor composition (A-1), thereby preparing a film. Film preparation properties of the prepared film are evaluated.

Storage Stability

The polyimide precursor composition (A-1) is stored at room temperature (25° C.) for 20 days, and then the liquid state of the composition, the viscosity of the composition, and the imidization rate of the polyimide precursor (PI precursor) are measured. Evaluation criteria for the liquid state are as follows.

A: stringiness is not viewed

B: stringiness is slightly viewed (when a spatula is put and pulled by 1 to 5 cm, the composition is not cut off).

C: stringiness is viewed (when a spatula is put and pulled by 5 to 20 cm, the composition is not cut off).

D: stringiness is remarkably viewed (when a spatula is put and pulled by 20 cm or greater, the composition is not cut off).

Film Preparation Properties

Film preparation is performed through the following operation by using the polyimide precursor composition (A-1) after being stored at room temperature (25° C.) for 20 days. Regarding a prepared film, (1) void trace and (2) surface unevenness and pattern are evaluated.

Coating method: bar coating method using a coating blade which has a spacer installed thereon so as to cause the thickness obtained by coating to be 100 μm.

Coating base: 1.1 mmt glass plate

Drying temperature: 60° C.×10 minutes

Firing temperature: 250° C.×30 minutes (1) Void Trace

It is evaluated whether or not a void trace is provided on the surface of the prepared film. Evaluation criteria are as follows.

A: formation of a void trace is not recognized.

B: the number of the void traces confirmed on the surface of the prepared film is 1 or more and less than 10.

C: 10 or more and less than 50 of void traces are scattered on the surface of the prepared film.

D: many void traces are uniformly formed on the surface of the prepared film.

(2) Surface Unevenness and Pattern

It is evaluated whether or not a surface unevenness and pattern is formed on the surface of the prepared film. Evaluation criteria are as follows.

A: formation of a surface unevenness and pattern is not viewed.

B: the surface unevenness and pattern is slightly recognized at a portion of the surface of the prepared film (less than 10% of the area of the surface of the prepared film).

C: the surface unevenness and pattern is recognized at a portion of the surface of the prepared film.

D: the surface unevenness and pattern is uniformly formed on the surface of the prepared film (10% or greater of the area of the surface of the prepared film).

Film Strength

The prepared film is punched with a dumbbell No. 3, so as to form a sample piece. The sample piece is installed in a tensile tester, and then an applied load (tensile breaking strength) and elongation at break (tensile elongation at break) when the sample piece is stretched and broken are measured.

Test device: tensile tester 1605 type manufactured by Aikoh engineering Co., Ltd.

Length of sample: 30 mm

Width of sample: 5 mm

Tensile speed: 10 mm/min

Examples 2 to 28

Preparation of Polyimide Precursor Compositions (A-2) to (A-28)

Polyimide precursor compositions (A-2) to (A-28) are prepared in the same manner as in Example 1 except that the condition of the polymerization process for the polyimide precursor composition is changed to conditions shown in Tables 1 to 4.

After the storage stability of the obtained polyimide precursor compositions is evaluated in the same manner as in Example 1, the film preparation properties and the film strength are evaluated. The evaluation results are shown in Tables 1 to 3 below.

Here, regarding the polyimide precursor compositions (A-2) to (A-28) just after being prepared, the solid content of the polyimide precursor (PI precursor) and the like are also measured in the same manner as in the case of the polyimide precursor composition (A-1) in Example 1.

Example 29

Solvent Substitution Method

Preparation of Polyimide Precursor Compositions (B-1) and (B-2)

Polymerization Process

A flask equipped with a stirring rod, a thermometer, and a dripping funnel is filled with 360 g of tetrahydrofuran (THF) and 40 g of water. 45.00 g (224.73 mmol) of 4,4'-diaminodiphenyl ether (ODA: molecular weight of 200.24) as the diamine compound and 15.47 g (89.89 mmol) of 4-ethynylphthalic anhydride as the acetylene compound are added therein while a dried nitrogen gas is introduced. While stirring is performed and the temperature of the solution is held to 30° C., 55.00 g (186.93 mmol) of 3,3',4,4'-biphenyl tetracarboxylic dianhydride (BPDA: molecular weight of 294.22) as the tetracarboxylic dianhydride are slowly added. Subsequently, while the temperature of the reaction is held to 30° C., the reaction is performed for 24 hours.

The imidization rate of the produced polyimide precursor is 0.02. The quantity of the terminal acetylene groups of the polyimide precursor is measured as described above. As a result, the polyimide precursor has acetylene groups at all the terminals.

The obtained polyimide precursor aqueous solution is set as a polyimide precursor composition (B-1). The composition of the obtained polyimide precursor composition (B-1) is as follows.

Composition of Polyimide precursor composition (B-1)

Solid content: 18.5% (solid fraction as polyimide), 20% (solid content of polyimide precursor)

Solvent composition ratio: THF/water=360 g/40 g

Amine-Salt Forming Process

The polyimide precursor solution obtained in the polymerization process is stirred, and 33.33 g (373.87 mmol) of dimethyl aminoethanol (DMAEt: molecular weight of 89.14) as the organic amine compound and 400 g of water are added thereto, thereby obtaining a polyimide precursor aqueous solution in which an amine salt of the polyimide precursor is formed and is dissolved in water.

Solvent Substitution Process

While the obtained polyimide precursor aqueous solution is stirred, pressure is reduced at 10 mmHg/30° C. to distill away a portion of the THF. Thus, a polyimide precursor composition (B-2) having the following composition is obtained.

Composition of Polyimide Precursor Composition (B-2)

Viscosity: 20 Pas

Solid content: 18.0% (solid fraction as polyimide), 18.8% (solid content of polyimide precursor)

Solvent composition ratio: THF/water=6/94

After the storage stability of the obtained polyimide precursor compositions is evaluated in the same manner as in Example 1, the film preparation properties and the film strength are evaluated. The evaluation results are shown in Table 4 below.

Examples 29 to 37

Preparation of Polyimide Precursor Compositions (B-3) and (B-11)

Polyimide precursor compositions (B-3) to (B-11) are prepared in the same manner as in Example 26 except that the condition of the polymerization process for the polyimide precursor composition is changed to conditions shown in Tables 1 to 4.

After the storage stability of the obtained polyimide precursor compositions is evaluated in the same manner as in Example 1, the film preparation properties and the film strength are evaluated. The evaluation results are shown in Table 4 below.

Here, regarding the polyimide precursor compositions (B-3) to (B-11) just after being prepared, the solid content of polyimide and the like are also measured in the same manner as in the case of the polyimide precursor composition (A-1) in Example 1.

Comparative Example 1

Preparation of Polyimide Precursor Composition (X-1)

A polyimide precursor composition (X-1) is prepared in the same manner as in the case of the polyimide precursor composition (A-2) in Example 2 except that 3-ethynylaniline is not added (the amount of each component is changed in accordance with Table 5). When the liquid state of (X-1) after being stored at room temperature (25° C.) for 20 days is recognized, viscosity is increased and stringiness occurs.

After the storage stability of the prepared polyimide precursor composition is evaluated in the same manner as in Example 1, the film preparation properties and the film strength are evaluated. The evaluation results are shown in Table 5 below.

When the liquid state of (X-1) and the liquid state of (A-2) after the storage stability (that is, after the composition is stored under an environment of room temperature (25° C.) and 20 days) are compared, the polyimide precursor in (A-2) is stably dissolved almost in a uniform state. However, in (X-1), viscosity is increased and stringiness intensively occurs. The imidization rate of (X-1) is 0.35, and thus imidization remarkably proceeds. In a molded article obtained by using (X-1), the void trace and the surface unevenness and pattern are increased, and the strength is lowered than that of the molded article obtained by using (A-2).

Comparative Example 2

Preparation of Polyimide Precursor Composition (X-2)

A polyimide precursor composition (X-2) is prepared in the same manner as in the case of the polyimide precursor composition (A-2) in Example 2 except that 3-ethynylaniline is not added (the amount of each component is changed in accordance with Table 5). The concentration of (X-2) is set to be lower than that of (X-1) in order to improve the storage stability. When the liquid state of (X-2) after being stored at room temperature (25° C.) for 20 days is recognized, an increase of the viscosity is prevented as compared with that in (X-1), but stringiness occurs. In a molded article obtained by using (X-2), the results in terms of the void trace and the surface unevenness and pattern are better than those of the molded article obtained by using (X-1). However, the strength is still low, as well as that of the molded article obtained by using (X-1).

Comparative Example 3

Preparation of Polyimide Precursor Composition (X-3)

A polyimide precursor composition (X-3) is prepared in the same manner as in the case of the polyimide precursor composition (A-2) in Example 2 except that 3-ethynylaniline is not added (the amount of each component is changed in accordance with Table 5). When the liquid state of (X-3) after being stored at room temperature (25° C.) for 20 days is recognized, gelling occurs.

Comparative Example 4

Preparation of Polyimide Precursor Composition (X-4)

A polyimide precursor composition (X-4) is prepared in the same manner as in the case of the polyimide precursor composition (B-1) in Example 29 except that 3-ethynylaniline is not added (the amount of each component is changed in accordance with Table 5). Regarding the liquid state of (X-4) after being stored at room temperature (25° C.) for 20 days, viscosity is increased and stringiness occurs.

TABLE 1

| Example | | | Example 1 | Example 2 | Example 3 | Example 4 | Example 5 |
|---|---|---|---|---|---|---|---|
| | Polyimide precursor composition | | A-1 | A-2 | A-3 | A-4 | A-5 |
| Synthesis condition | Tetracarboxylic dianhydride | Chemical type | BPDA | BPDA | PMDA | BTDA | BPDA |
| | | g | 70.00 | 70.00 | 70.00 | 70.00 | 70.00 |
| | | mmol | 237.92 | 237.92 | 320.92 | 217.24 | 237.92 |
| | Diamine compound | Chemical type | PDA | ODA | ODA | PDA | ODA |
| | | g | 21.44 | 39.70 | 53.55 | 19.58 | 57.40 |
| | | mmol | 198.26 | 198.26 | 267.44 | 181.03 | 286.65 |
| | Tetracarboxylic dianhydride/diamine compound (molar ratio) | | 1.2 | 1.2 | 1.2 | 1.2 | 0.83 |
| | Organic amine compound | Chemical type 1 | MMO | MMO | MMO | MMO | MMO |
| | | g | 48.13 | 48.13 | 64.92 | 47.61 | 48.13 |
| | | mmol | 475.83 | 475.83 | 641.85 | 434.47 | 475.83 |

TABLE 1-continued

| | | | | | | | |
|---|---|---|---|---|---|---|---|
| | | Chemical type 2 | — | — | — | — | — |
| | | g | — | — | — | — | — |
| | | mmol | — | — | — | — | — |
| | Treatment ratio | mol % | 100 | 100 | 100 | 100 | 100 |
| | Aqueous solvent | Chemical type 1 | Water | Water | Water | Water | Water |
| | | g | 308 | 286 | 313 | 227 | 336 |
| | | Chemical type 2 | — | DMI | DMI | DMI | DMI |
| | | g | — | 95 | 104 | 76 | 112 |
| | Acetylene compound | Chemical type | 3-ethynyl aniline | 3-ethynyl aniline | 3-ethynyl aniline | 3-ethynyl aniline | 4-ethynyl phthalic anhydride |
| | | g | 9.29 | 9.29 | 12.53 | 8.48 | 13.43 |
| | | mmol | 79.31 | 79.31 | 106.97 | 72.41 | 114.66 |
| | Quantity of terminal acetylene | % | 100 | 100 | 100 | 100 | 100 |
| | Solid content of PI precursor | % | 20 | 20 | 20 | 20 | 20 |
| | Liquid state | | Dissolved | Dissolved | Dissolved | Dissolved | Dissolved |
| | Imidization ratio | | 0.02 | 0.02 | 0.02 | 0.02 | 0.02 |
| | Molecular weight of PI precursor | Mw | 10000 | 10000 | 10000 | 10000 | 10000 |
| | PI solid content | % | 18.5 | 18.5 | 18.5 | 18.5 | 18.5 |
| | Viscosity | Pa · s | 21 | 18 | 20 | 30 | 19 |
| Storage stability | Storage condition | | Room temperature and 20 days | Room temperature and 20 days | Room temperature and 20 days | Room temperature and 20 days | Room temperature and 20 days |
| | Liquid state | | Dissolved | Dissolved | Dissolved | Dissolved | Dissolved |
| | Stringiness | | A | A | A | A | A |
| | Viscosity | Pa · s | 21 | 19 | 22 | 29 | 19 |
| | Imidization ratio | | 0.03 | 0.03 | 0.04 | 0.03 | 0.04 |
| Film preparation properties | Void trace | | A | A | A | A | A |
| | Surface unevenness and pattern | | A | A | A | A | A |
| Film strength | Tensile breaking strength | MPa | 320 | 210 | 190 | 310 | 210 |
| | Tensile elongation at break | % | 50 | 90 | 80 | 50 | 90 |

| Example | | | Example 6 | Example 7 | Example 8 | Example 9 | Example 10 |
|---|---|---|---|---|---|---|---|
| | Polyimide precursor composition | | A-6 | A-7 | A-8 | A-9 | A-10 |
| Synthesis condition | Tetracarboxylic dianhydride | Chemical type | BPDA | BPDA | BPDA | PMDA | BPDA |
| | | g | 70.00 | 70.00 | 70.00 | 70.00 | 70.00 |
| | | mmol | 237.92 | 237.92 | 237.92 | 320.92 | 237.92 |
| | Diamine compound | Chemical type | ODA | ODA | ODA | ODA | ODA |
| | | g | 39.70 | 39.70 | 45.37 | 63.00 | 39.70 |
| | | mmol | 198.26 | 198.26 | 226.59 | 314.63 | 198.26 |
| | Tetracarboxylic dianhydride/diamine compound (molar ratio) | | 1.2 | 1.2 | 1.05 | 1.02 | 1.2 |
| | Organic amine compound | Chemical type 1 | DMAEt | MMO | MMO | 2,4,6-collidine | morpholine |
| | | g | 42.42 | 48.13 | 48.13 | 77.78 | 41.45 |
| | | mmol | 475.83 | 475.83 | 475.83 | 641.85 | 475.83 |
| | | Chemical type 2 | — | — | — | — | — |
| | | g | — | — | — | — | — |
| | | mmol | — | — | — | — | — |
| | Treatment ratio | mol % | 100 | 100 | 100 | 100 | 100 |
| | Aqueous solvent | Chemical type 1 | Water | Water | Water | Water | Water |
| | | g | 290 | 286 | 302 | 330 | 209 |
| | | Chemical type 2 | DMI | DMI | DMI | DMI | DMI |
| | | g | 97 | 95 | 101 | 110 | 70 |
| | Acetylene compound | Chemical type | 3-ethynyl aniline | 3-ethynyl aniline | 3-ethynyl aniline | 3-ethynyl aniline | 3-ethynyl aniline |
| | | g | 9.29 | 9.29 | 10.62 | 14.74 | 9.29 |
| | | mmol | 79.31 | 79.31 | 90.64 | 125.85 | 79.31 |
| | Quantity of terminal acetylene | % | 100 | 100 | 100 | 100 | 100 |
| | Solid content of PI precursor | % | 20 | 20 | 20 | 20 | 25 |
| | Liquid state | | Dissolved | Dissolved | Dissolved | Dissolved | Dissolved |
| | Imidization ratio | | 0.02 | 0.05 | 0.05 | 0.05 | 0.02 |
| | Molecular weight of PI precursor | Mw | 10000 | 5000 | 50000 | 100000 | 2000 |
| | PI solid content | % | 18.5 | 18.5 | 18.5 | 18.5 | 23.2 |
| | Viscosity | Pa · s | 18 | 10 | 90 | 110 | 15 |
| Storage stability | Storage condition | | Room temperature and 20 days | Room temperature and 20 days | Room temperature and 20 days | Room temperature and 20 days | Room temperature and 20 days |
| | Liquid state | | Dissolved | Dissolved | Dissolved | Dissolved | Dissolved |
| | Stringiness | | A | A | A | A | A |

TABLE 1-continued

| | | | | | | | |
|---|---|---|---|---|---|---|---|
| | Viscosity | Pa · s | 18 | 11 | 95 | 112 | 18 |
| | Imidization ratio | | 0.04 | 0.03 | 0.05 | 0.02 | 0.06 |
| Film preparation properties | Void trace | | A | A | A | A | A |
| | Surface unevenness and pattern | | A | A | A | A | A |
| Film strength | Tensile breaking strength | MPa | 190 | 180 | 200 | 190 | 180 |
| | Tensile elongation at break | % | 80 | 75 | 80 | 70 | 75 |

TABLE 2

| Example | | | Example 11 | Example 12 | Example 13 | Example 14 | Example 15 |
|---|---|---|---|---|---|---|---|
| | Polyimide precursor composition | | A-11 | A-12 | A-13 | A-14 | A-15 |
| Synthesis condition | Tetracarboxylic dianhydride | Chemical type | BPDA | BPDA | BPDA | BPDA | BPDA |
| | | g | 70.00 | 70.00 | 70.00 | 70.00 | 70.00 |
| | | mmol | 237.92 | 237.92 | 237.92 | 237.92 | 237.92 |
| | Diamine compound | Chemical type | ODA | ODA | ODA | ODA | ODA |
| | | g | 39.70 | 39.70 | 39.70 | 39.70 | 39.70 |
| | | mmol | 198.26 | 198.26 | 198.26 | 198.26 | 198.26 |
| | Tetracarboxylic dianhydride/diamine compound (molar ratio) | | 1.2 | 1.2 | 1.2 | 1.2 | 1.2 |
| | Organic amine compound | Chemical type 1 | N-ethyl morpholine | 2-ethyl-4-methyl imidazole | 1,2-dimethyl imidazole | TEA | N-methyl piperidine |
| | | g | 52.42 | 54.80 | 45.74 | 48.15 | 47.19 |
| | | mmol | 475.83 | 475.83 | 475.83 | 475.83 | 475.83 |
| | | Chemical type 2 | — | — | — | — | — |
| | | g | — | — | — | — | — |
| | | mmol | — | — | — | — | — |
| | Treatment ratio | mol % | 100 | 100 | 100 | 100 | 100 |
| | Aqueous solvent | Chemical type 1 | Water | Water | Water | Water | Water |
| | | g | 283 | 281 | 288 | 286 | 287 |
| | | Chemical type 2 | DMI | DMI | DMI | DMI | DMI |
| | | g | 94 | 94 | 96 | 95 | 96 |
| | Acetylene compound | Chemical type | 3-ethynyl aniline | 3-ethynyl aniline | 3-ethynyl aniline | 3-ethynyl aniline | 3-ethynyl aniline |
| | | g | 9.29 | 9.29 | 9.29 | 9.29 | 9.29 |
| | | mmol | 79.31 | 79.31 | 79.31 | 79.31 | 79.31 |
| | Quantity of terminal acetylene | % | 100 | 100 | 100 | 100 | 100 |
| | Solid content of PI precursor | % | 20 | 20 | 20 | 20 | 20 |
| | Liquid state | | Dissolved | Dissolved | Dissolved | Dissolved | Dissolved |
| | Imidization ratio | | 0.02 | 0.02 | 0.02 | 0.02 | 0.02 |
| | Molecular weight of PI precursor | Mw | 10000 | 10000 | 10000 | 10000 | 10000 |
| | PI solid content | % | 18.5 | 18.5 | 18.5 | 18.5 | 18.5 |
| | Viscosity | Pa · s | 22 | 26 | 28 | 17 | 16 |
| Storage stability | Storage condition | | Room temperature and 20 days | Room temperature and 20 days | Room temperature and 20 days | Room temperature and 20 days | Room temperature and 20 days |
| | Liquid state | | Dissolved | Dissolved | Dissolved | Dissolved | Dissolved |
| | Stringiness | | A | A | A | A | A |
| | Viscosity | Pa · s | 22 | 27 | 28 | 17 | 17 |
| | Imidization ratio | | 0.02 | 0.02 | 0.02 | 0.02 | 0.02 |
| Film preparation properties | Void trace | | A | A | A | A | A |
| | Surface unevenness and pattern | | A | A | A | A | A |
| Film strength | Tensile breaking strength | MPa | 210 | 190 | 190 | 210 | 190 |
| | Tensile elongation at break | % | 90 | 80 | 80 | 90 | 80 |

| Example | | | Example 16 | Example 17 | Example 18 | Example 19 | Example 20 |
|---|---|---|---|---|---|---|---|
| | Polyimide precursor composition | | A-16 | A-17 | A-18 | A-19 | A-20 |
| Synthesis condition | Tetracarboxylic dianhydride | Chemical type | CBDA | BPDA | BPDA | BPDA | BPDA |
| | | g | 70.00 | 70.00 | 70.00 | 70.00 | 70.00 |
| | | mmol | 356.94 | 237.92 | 237.92 | 237.92 | 237.92 |
| | Diamine compound | Chemical type | 1,6-cyclohexene diamine | ODA | PDA | ODA | ODA |
| | | g | 33.97 | 39.70 | 21.44 | 39.70 | 39.70 |
| | | mmol | 297.45 | 198.26 | 198.26 | 198.26 | 198.26 |

TABLE 2-continued

| | | | | | | | |
|---|---|---|---|---|---|---|---|
| | Tetracarboxylic dianhydride/diamine compound (molar ratio) | | 1.2 | 1.2 | 1.2 | 1.2 | 1.2 |
| | Organic amine compound | Chemical type 1 | MMO | MMO | MMO | MMO | MMO |
| | | g | 72.21 | 24.07 | 48.13 | 48.13 | 48.13 |
| | | mmol | 713.89 | 237.92 | 475.83 | 475.83 | 475.83 |
| | | Chemical type 2 | — | TEA | TEA | — | — |
| | | g | — | 24.07 | 24.07 | — | — |
| | | mmol | — | 400.48 | 400.48 | — | — |
| | Treatment ratio | mol % | 100 | 100 | 150 | 100 | 100 |
| | Aqueous solvent | Chemical type 1 | Water | Water | Water | Water | Water |
| | | g | 247 | 304 | 163 | 249 | 423 |
| | | Chemical type 2 | DMI | 1-propanol | 1-methoxy-2-propanol | 1-methoxy-2-propanol | 2-methoxy ethanol |
| | | g | 82 | 101 | 54 | 83 | 141 |
| | Acetylene compound | Chemical type | 3-ethynyl aniline | 3-ethynyl aniline | 3-ethynyl aniline | 3-ethynyl aniline | 3-ethynyl aniline |
| | | g | 13.94 | 9.29 | 9.29 | 9.29 | 9.29 |
| | | mmol | 118.98 | 79.31 | 79.31 | 79.31 | 79.31 |
| | Quantity of terminal acetylene | % | 100 | 100 | 100 | 100 | 100 |
| | Solid content of PI precursor | % | 20 | 20 | 25 | 22 | 15 |
| | Liquid state | | Dissolved | Dissolved | Dissolved | Dissolved | Dissolved |
| | Imidization ratio | | 0.02 | 0.02 | 0.02 | 0.02 | 0.02 |
| | Molecular weight of PI precursor | Mw | 10000 | 10000 | 10000 | 10000 | 10000 |
| | PI solid content | % | 18.5 | 18.5 | 23.2 | 20.4 | 13.9 |
| | Viscosity | Pa · s | 22 | 19 | 83 | 44 | 10 |
| Storage stability | Storage condition | | Room temperature and 20 days | Room temperature and 20 days | Room temperature and 20 days | Room temperature and 20 days | Room temperature and 20 days |
| | Liquid state | | Dissolved | Dissolved | Dissolved | Dissolved | Dissolved |
| | Stringiness | | A | A | A | A | A |
| | Viscosity | Pa · s | 22 | 19 | 87 | 46 | 11 |
| | Imidization ratio | | 0.04 | 0.05 | 0.05 | 0.05 | 0.03 |
| Film preparation properties | Void trace | | A | A | A | A | A |
| | Surface unevenness and pattern | | A | A | A | A | A |
| Film strength | Tensile breaking strength | MPa | 340 | 210 | 320 | 190 | 200 |
| | Tensile elongation at break | % | 50 | 90 | 45 | 75 | 80 |

TABLE 3

| Example | | | Example 21 | Example 22 | Example 23 | Example 24 |
|---|---|---|---|---|---|---|
| | Polyimide precursor composition | | A-21 | A-22 | A-23 | A-24 |
| Synthesis condition | Tetracarboxylic dianhydride | Chemical type | BPDA | BPDA | BPDA | BPDA |
| | | g | 70.00 | 70.00 | 70.00 | 70.00 |
| | | mmol | 237.92 | 237.92 | 237.92 | 237.92 |
| | Diamine compound | Chemical type | ODA | ODA | ODA | ODA |
| | | g | 39.70 | 39.70 | 39.70 | 39.70 |
| | | mmol | 198.26 | 198.26 | 198.26 | 198.26 |
| | Tetracarboxylic dianhydride/diamine compound (molar ratio) | | 1.2 | 1.2 | 1.2 | 1.2 |
| | Organic amine compound | Chemical type 1 | MMO | MMO | MMO | MMO |
| | | g | 48.13 | 48.13 | 48.15 | 45.74 |
| | | mmol | 475.83 | 475.83 | 475.83 | 475.83 |
| | | Chemical type 2 | — | — | — | — |
| | | g | — | — | — | — |
| | | mmol | — | — | — | — |
| | Treatment ratio | mol % | 100 | 100 | 100 | 100 |
| | Aqueous solvent | Chemical type 1 | Water | Water | Water | Water |
| | | g | 293 | 291 | 288 | 289 |
| | | Chemical type 2 | DMI | DMI | DMI | DMI |
| | | g | 98 | 97 | 96 | 96 |
| | Acetylene compound | Chemical type | 3-ethynyl aniline | 3-ethynyl aniline | 3-ethynyl aniline | 3-ethynyl aniline |
| | | g | 0.46 | 2.79 | 6.50 | 8.36 |
| | | mmol | 3.97 | 23.79 | 55.51 | 71.38 |
| | Quantity of terminal acetylene | % | 5 | 30 | 70 | 90 |
| | Solid content of PI precursor | % | 20 | 20 | 20 | 20 |
| | Liquid state | | Dissolved | Dissolved | Dissolved | Dissolved |
| | Imidization ratio | | 0.02 | 0.02 | 0.02 | 0.02 |

TABLE 3-continued

| | | | | | | |
|---|---|---|---|---|---|---|
| | Molecular weight of PI precursor | Mw | 10000 | 10000 | 10000 | 10000 |
| | PI solid content | % | 18.5 | 18.5 | 18.5 | 18.5 |
| | Viscosity | Pa · s | 21 | 22 | 20 | 20 |
| Storage stability | Storage condition | | Room temperature and 20 days | Room temperature and 20 days | Room temperature and 20 days | Room temperature and 20 days |
| | Liquid state | | Dissolved | Dissolved | Dissolved | Dissolved |
| | Stringiness | | B | B | B | A |
| | Viscosity | Pa · s | 45 | 30 | 22 | 20 |
| | Imidization ratio | | 0.02 | 0.02 | 0.02 | 0.02 |
| Film preparation properties | Void trace | | A | A | A | A |
| | Surface unevenness and pattern | | B | B | A | A |
| Film strength | Tensile breaking strength | MPa | 170 | 195 | 200 | 230 |
| | Tensile elongation at break | % | 75 | 85 | 85 | 90 |

| Example | | | Example 25 | Example 26 | Example 27 | Example 28 |
|---|---|---|---|---|---|---|
| | Polyimide precursor composition | | A-25 | A-26 | A-27 | A-28 |
| Synthesis condition | Tetracarboxylic dianhydride | Chemical type | BPDA | BPDA | BPDA | BPDA |
| | | g | 70.00 | 70.00 | 70.00 | 70.00 |
| | | mmol | 237.92 | 237.92 | 237.92 | 237.92 |
| | Diamine compound | Chemical type | ODA | ODA | ODA | ODA |
| | | g | 39.70 | 39.70 | 39 70 | 39.70 |
| | | mmol | 198.26 | 198.26 | 198.26 | 198.26 |
| | Tetracarboxylic dianhydride/diamine compound (molar ratio) | | 1.2 | 1.2 | 1.2 | 1.2 |
| | Organic amine compound | Chemical type 1 | MMO | MMO | MMO | MMO |
| | | g | 45.74 | 45.74 | 45.74 | 45.74 |
| | | mmol | 475.83 | 475.83 | 475.83 | 475.83 |
| | | Chemical type 2 | — | — | — | — |
| | | g | — | — | — | — |
| | | mmol | — | — | — | — |
| | Treatment ratio | mol % | 100 | 30 | 50 | 75 |
| | Aqueous solvent | Chemical type 1 | Water | Water | Water | Water |
| | | g | 288 | 288 | 288 | 288 |
| | | Chemical type 2 | DMI | DMI | DMI | DMI |
| | | g | 96 | 96 | 96 | 96 |
| | Acetylene compound | Chemical type | 4-ethynyl aniline | 3-ethynyl aniline | 3-ethynyl aniline | 3-ethynyl aniline |
| | | g | 9.29 | 9.29 | 9.29 | 9.29 |
| | | mmol | 79.31 | 79.31 | 79.31 | 79.31 |
| | Quantity of terminal acetylene | % | 100 | 100 | 100 | 100 |
| | Solid content of PI precursor | % | 20 | 20 | 20 | 20 |
| | Liquid state | | Dissolved | Dissolved | Dissolved | Dissolved |
| | Imidization ratio | | 0.02 | 0.02 | 0.02 | 0.02 |
| | Molecular weight of PI precursor | Mw | 10000 | 10000 | 10000 | 10000 |
| | PI solid content | % | 18.5 | 18.5 | 18.5 | 18.5 |
| | Viscosity | Pa · s | 20 | 55 | 40 | 34 |
| Storage stability | Storage condition | | Room temperature and 20 days | Room temperature and 20 days | Room temperature and 20 days | Room temperature and 20 days |
| | Liquid state | | Dissolved | Dissolved | Dissolved | Dissolved |
| | Stringiness | | A | A | A | A |
| | Viscosity | Pa · s | 20 | 65 | 44 | 35 |
| | Imidization ratio | | 0.02 | 0.02 | 0.02 | 0.02 |
| Film preparation properties | Void trace | | A | A | A | A |
| | Surface unevenness and pattern | | A | A | A | A |
| Film strength | Tensile breaking strength | MPa | 190 | 210 | 220 | 230 |
| | Tensile elongation at break | % | 70 | 75 | 75 | 85 |

TABLE 4

| | Example•Comparative Example | | Example 29 | | Example 30 | Example 31 | Example 32 |
|---|---|---|---|---|---|---|---|
| | Polyimide precursor composition | | B-1 | B-2 | B-3 | B-4 | B-5 |
| Polymerization process | Tetracarboxylic dianhydride | Chemical type | BPDA | BPDA | BPDA | BPDA | BPDA |
| | | g | 55 | 55 | 55 | 55 | 55 |
| | | mmol | 186.93 | 186.93 | 186.93 | 186.93 | 186.93 |
| | Diamine compound | Chemical type | ODA | ODA | ODA | ODA | ODA |
| | | g | 45 | 45 | 45 | 45 | 45 |
| | | mmol | 224.73 | 224.73 | 224.73 | 224.73 | 224.73 |
| | Tetracarboxylic dianhydride/diamine compound (molar ratio) | | 0.83 | 0.83 | 0.83 | 0.83 | 0.83 |
| | Solvent 1 | Chemical type | THF | THF | THF | THF | THF |
| | | g | 360 | 360 | 360 | 360 | 360 |
| | Solvent 2 | Chemical type | Water | Water | Water | Water | Water |
| | | g | 40 | 40 | 40 | 40 | 40 |
| | Solvent 1/solvent 2 | | 9/1 | 9/1 | 9/1 | 9/1 | 9/1 |
| | Acetylene compound | Chemical type | 4-ethynyl phthalic anhydride | 4-ethynyl phthalic anhydride | 4-ethynyl phthalic anhydride | 4-ethynyl phthalic anhydride | 4-ethynyl phthalic anhydride |
| | | g | 15.47 | 15.47 | 15.47 | 15.47 | 15.47 |
| | | mmol | 89.89 | 89.89 | 89.89 | 89.89 | 89.89 |
| | Quantity of terminal acetylene | | 100 | 100 | 100 | 100 | 100 |
| | Liquid state | | Dissolved | Dissolved | Dissolved | Dissolved | Dissolved |
| | Imidization ratio | | 0.02 | 0.02 | 0.02 | 0.02 | 0.02 |
| | Molecular weight of PI precursor | Mw | 10000 | 10000 | 10000 | 10000 | 10000 |
| | PI solid content | % | 20 | 20 | 20 | 20 | 20 |
| | Viscosity | Pa · s | 20 | 21 | 25 | 20 | 22 |
| Amine-salt forming process | Organic amine compound | Chemical type | — | DMAEt | DMAEt | DMAEt | DMAEt |
| | | g | — | 33.33 | 16.66 | 166.63 | 25.00 |
| | | mmol | — | 373.87 | 186.93 | 1869.35 | 280.40 |
| | Added solvent | Chemical type | — | Water | Water | Water | Water |
| | | g | — | 400 | 400 | 400 | 300 |
| | Treatment ratio | mol % | — | 100 | 50 | 500 | 75 |
| | Liquid state | | — | — | Dissolved | Dissolved | Dissolved |
| Solvent substitution process | Liquid state | | — | — | Dissolved | Dissolved | Dissolved |
| | Molecular weight of PI precursor | % | — | 18.8 | 18.8 | 18.8 | 14.6 |
| | PI solid content | % | — | 18 | 18 | 18 | 14 |
| | Viscosity | Pa · s | — | 20 | 26 | 18 | 30 |
| | Moisture content in solvent | % | — | 94 | 98 | 86 | 50 |
| Storage stability | Storage condition | | Room temperature and 20 days | Room temperature and 20 days | Room temperature and 20 days | Room temperature and 20 days | Room temperature and 20 days |
| | Liquid state | | Dissolved | Dissolved | Dissolved | Dissolved | Dissolved |
| | Stringiness | | A | A | A | A | A |
| | Viscosity | Pa · s | 22 | 22 | 26 | 21 | 22 |
| | Imidization ratio | | 0.03 | 0.03 | 0.03 | 0.03 | 0.03 |
| Film preparation properties | Void trace | | — | A | A | A | A |
| | Surface unevenness and pattern | | — | A | A | A | A |
| Film strength | Tensile breaking strength | MPa | — | 190 | 200 | 210 | 230 |
| | Tensile elongation at break | % | — | 80 | 75 | 80 | 90 |

| | Example•Comparative Example | | Example 33 | Example 34 | Example 35 | Example 36 | Example 37 |
|---|---|---|---|---|---|---|---|
| | Polyimide precursor composition | | B-6 | B-7 | B-8 | B-9 | B-10 |
| Polymerization process | Tetracarboxylic dianhydride | Chemical type | BPDA | BPDA | BPDA | BPDA | BPDA |
| | | g | 55 | 55 | 55 | 55 | 55 |
| | | mmol | 186.93 | 186.93 | 186.93 | 186.93 | 186.93 |
| | Diamine compound | Chemical type | ODA | ODA | ODA | ODA | ODA |
| | | g | 45 | 45 | 45 | 45 | 45 |
| | | mmol | 224.73 | 224.73 | 224.73 | 224.73 | 224.73 |
| | Tetracarboxylic dianhydride/diamine compound (molar ratio) | | 0.83 | 0.83 | 0.83 | 0.83 | 0.83 |
| | Solvent 1 | Chemical type | THF | THF | THF | 1,4-dioxane | Acetone |
| | | g | 360 | 360 | 360 | 320 | 320 |
| | Solvent 2 | Chemical type | Water | Water | Water | Water | Water |
| | | g | 40 | 40 | 40 | 80 | 80 |
| | Solvent 1/solvent 2 | | 9/1 | 9/1 | 9/1 | 8/2 | 8/2 |
| | Acetylene compound | Chemical type | 4-ethynyl phthalic anhydride | 4-ethynyl phthalic anhydride | 4-ethynyl phthalic anhydride | 4-ethynyl phthalic anhydride | 4-ethynyl phthalic anhydride |
| | | g | 15.47 | 15.47 | 15.47 | 15.47 | 15.47 |
| | | mmol | 89.89 | 89.89 | 89.89 | 89.89 | 89.89 |

TABLE 4-continued

| | | | | | | | |
|---|---|---|---|---|---|---|---|
| | Quantity of terminal acetylene | | 100 | 100 | 100 | 100 | 100 |
| | Liquid state | | Dissolved | Dissolved | Dissolved | Dissolved | Dissolved |
| | Imidization ratio | | 0.02 | 0.02 | 0.02 | 0.05 | 0.08 |
| | Molecular weight of PI precursor | Mw | 10000 | 10000 | 10000 | 10000 | 10000 |
| | PI solid content | % | 20 | 20 | 20 | 20 | 20 |
| | Viscosity | Pa · s | 22 | 23 | 25 | 20 | 20 |
| Amine-salt forming process | Organic amine compound | Chemical type | γ-Pyc | MAEt | Eta | DMAEt | DMAEt |
| | | g | 34.82 | 28.08 | 22.84 | 33.33 | 33.33 |
| | | mmol | 373.87 | 373.87 | 373.87 | 373.87 | 373.87 |
| | Added solvent | Chemical type | Water | Water | Water | Water | Water |
| | | g | 400 | 400 | 400 | 400 | 400 |
| | Treatment ratio | mol % | 100 | 100 | 100 | 100 | 100 |
| | Liquid state | | Dissolved | Dissolved | Dissolved | Dissolved | Dissolved |
| Solvent substitution process | Liquid state | | Dissolved | Dissolved | Dissolved | Dissolved | Dissolved |
| | Molecular weight of PI precursor | % | 18.8 | 18.8 | 18.8 | 15.7 | 18.8 |
| | PI solid content | % | 18 | 18 | 18 | 15 | 18 |
| | Viscosity | Pa · s | 26 | 23 | 24 | 30 | 32 |
| | Moisture content in solvent | % | 92 | 90 | 88 | 92 | 96 |
| Storage stability | Storage condition | | Room temperature and 20 days | Room temperature and 20 days | Room temperature and 20 days | Room temperature and 20 days | Room temperature and 20 days |
| | Liquid state | | Dissolved | Dissolved | Dissolved | Dissolved | Dissolved |
| | Stringiness | | A | A | A | A | A |
| | Viscosity | Pa · s | 22 | 24 | 24 | 21 | 22 |
| | Imidization ratio | | 0.03 | 0.03 | 0.03 | 0.03 | 0.03 |
| Film preparation properties | Void trace | | A | A | A | A | A |
| | Surface unevenness and pattern | | A | A | A | B | B |
| Film strength | Tensile breaking strength | MPa | 200 | 195 | 200 | 220 | 230 |
| | Tensile elongation at break | % | 85 | 80 | 75 | 90 | 80 |

TABLE 5

| | Comparative Example | | Comparative Example 1 | Comparative Example 2 | Comparative Example 3 |
|---|---|---|---|---|---|
| | Polyimide precursor composition | | X-1 | X-2 | X-3 |
| Synthesis condition | Tetracarboxylic dianhydride | Chemical type | BPDA | BPDA | BPDA |
| | | g | 55 | 55 | 55 |
| | | mmol | 186.93 | 186.93 | 186.93 |
| | Diamine compound | Chemical type | ODA | ODA | ODA |
| | | g | 45 | 45 | 45 |
| | | mmol | 224.73 | 224.73 | 224.73 |
| | Tetracarboxylic dianhydride/diamine compound (molar ratio) | | 0.9 | 0.9 | 0.99 |
| | Organic amine compound | Chemical type 1 | MMO | MMO | MMO |
| | | g | 37.82 | 37.82 | 37.82 |
| | | mmol | 373.87 | 373.87 | 373.87 |
| | | Chemical type 2 | — | — | — |
| | | g | — | — | — |
| | | mmol | — | — | — |
| | Treatment ratio | mol % | 100 | 100 | 100 |
| | Aqueous solvent | Chemical type 1 | Water | Water | Water |
| | | g | 272 | 474 | 474 |
| | | Chemical type 2 | DMI | DMI | DMI |
| | | g | 91 | 158 | 158 |
| | Acetylene compound | Chemical type | — | — | — |
| | | g | | — | — |
| | | mmol | — | — | — |
| | Quantity of terminal acetylene | % | 0 | 0 | 0 |
| | Solid content of PI precursor | % | 20 | 13 | 13 |
| | Liquid state | | Dissolved | Dissolved | Dissolved |
| | Imidization ratio | | 0.02 | 0.02 | 0.02 |
| | Molecular weight of PI precursor | Mw | 10000 | 10000 | 100000 |
| | PI solid content | % | 18.5 | 12.1 | 12.1 |
| | Viscosity | Pa · s | 30 | 38 | 130 |
| | Terminal amino group | | Contained | Contained | Contained |
| Storage stability | Storage condition | | Room temperature and 20 days | Room temperature and 20 days | Room temperature and 20 days |

TABLE 5-continued

| Comparative Example | | | Comparative Example 1 | Comparative Example 2 | Comparative Example 3 |
|---|---|---|---|---|---|
| | Liquid state | | Dissolved | Dissolved | Gelling |
| | Stringiness | | D | D | — |
| | Viscosity | Pa · s | 210 | 45 | — |
| | Imidization ratio | | 0.35 | 0.08 | 0.3 |
| Film preparation properties | Void trace | | C | A | — |
| | Surface unevenness and pattern | | B | B | — |
| Film strength | Tensile breaking strength | MPa | 85 | 90 | — |
| | Tensile elongation at break | % | 13 | 25 | — |

TABLE 6

| Example•Comparative Example | | | Comparative Example 4 |
|---|---|---|---|
| | Polyimide precursor composition | | X-4 |
| Polymerization process | Tetracarboxylic dianhydride | Chemical type | BPDA |
| | | g | 55 |
| | | mmol | 186.93 |
| | Diamine compound | Chemical type | ODA |
| | | g | 45 |
| | | mmol | 224.73 |
| | Tetracarboxylic dianhydride/diamine compound (molar ratio) | | 0.83 |
| | Solvent 1 | Chemical type | THF |
| | | g | 360 |
| | Solvent 2 | Chemical type | Water |
| | | g | 40 |
| | Solvent 1/solvent 2 | | 9/1 |
| | Acetylene compound | Chemical type | — |
| | | g | — |
| | | mmol | — |
| | Quantity of terminal acetylene | | 0 |
| | Liquid state | | Dissolved |
| | Imidization ratio | | 0.02 |
| | Molecular weight of PI precursor | Mw | 5000 |
| | PI solid content | % | 20 |
| | Viscosity | Pa · s | 20 |
| Amine-salt forming process | Organic amine compound | Chemical type | — |
| | | g | — |
| | | mmol | — |
| | Added solvent | Chemical type | — |
| | | g | — |
| | Treatment ratio | mol % | — |
| | Liquid state | | — |
| Solvent substitution process | Liquid state | | — |
| | Molecular weight of PI precursor | % | — |
| | PI solid content | % | — |
| | Viscosity | Pa · s | — |
| | Moisture content in solvent | % | — |
| Storage stability | Storage condition | | Room temperature and 20 days |
| | Liquid state | | Dissolved |
| | Stringiness | | D |
| | Viscosity | Pa · s | 190 |
| | Imidization ratio | | 0.1 |
| Film preparation properties | Void trace | | — |
| | Surface unevenness and pattern | | — |
| Film strength | Tensile breaking strength | MPa | — |
| | Tensile elongation at break | % | — |

From the results, it is found that favorable results for evaluation of the storage stability of the polyimide precursor composition are obtained in these examples as compared with the comparative examples.

It is found that favorable results for evaluation of the coating stability and the film preparation properties of the polyimide precursor composition are also obtained in these examples as compared with the comparative examples. It is found that favorable results for evaluation of the mechanical strength are also obtained in these examples.

Abbreviations and the like in Table 1 to Table 6 are as follows. "-" in Table 1 to Table 5 means being not added or being not performed.

Tetracarboxylic dianhydride: "BPDA" (3,3',4,4'-biphenyl tetracarboxylic dianhydride), "PMDA" (pyromelletic dianhydride), "BTDA" (benzophenone tetracarboxylic dianhydride), and "CBDA" (cyclobutane-1,2:3,4-tetracarboxylic dianhydride)

Diamine compound: "ODA" (4,4'-diaminodiphenyl ether) and "PDA" (p-phenylenediamine)

Organic amine compound: MMO (methyl morpholine: tertiary amine compound: boiling point of 115° C. to 116° C.), 2,4,6-collidine (tertiary amine compound: molecular weight of 121.18, boiling point of 171° C.), morpholine (secondary amine compound: molecular weight of 87.1, boiling point of 129° C.), ethyl morpholine (tertiary amine compound: molecular weight of 115.17, boiling point of 139° C.), 2-ethyl-4-methylimidazole (tertiary amine compound: molecular weight of 110.16, boiling point of 292° C. to 295° C.), DMAEt (dimethyl aminoethanol: tertiary amine compound: boiling point of 133° C. to 134° C.), TEA (triethanolamine: tertiary amine compound: boiling point of 360° C.), and N-methyl piperidine (tertiary amine compound: 106° C. to 107° C.)

Solvent: THF (tetrahydrofuran: water-soluble ether solvent: boiling point of 67° C.), NMP (N-methyl-2-pyrrolidone), and DMI (1,3-dimethyl-2-imidazolidinone, boiling point: 224° C. to 226° C.)

In the examples, "a treatment ratio" means the quantity (mol %) of the organic amine compound with respect to the theoretical amount of the carboxy group included in the polyimide precursor. Here, the theoretical amount of the carboxy group represents a value obtained by doubling the molar amount of the tetracarboxylic dianhydride used in the polyimide precursor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor composition comprising a solvent and a polyimide precursor including a group having a triple bond at a terminal thereof, which is dissolved in the solvent, wherein the solvent comprises water and a compound selected from the group consisting of morpholines and amino alcohols, and wherein a content of the compound selected from the group consisting of morpholines and amino alcohols is from 80 mol % to 120 mol % with respect to a carboxy group (—COOH) of the polyimide precursor in the polyimide precursor composition.

2. The polyimide precursor composition according to claim 1, wherein a content of the polyimide precursor is from 10% by weight to 50% by weight with respect to the polyimide precursor composition.

3. The polyimide precursor composition according to claim 1, wherein the group having a triple bond is at least one group selected from the group consisting of an alkynyl group having 2 to 10 carbon atoms.

4. The polyimide precursor composition according to claim 3, wherein the group having a triple bond is an acetylene group.

5. The polyimide precursor composition according to claim 1, wherein a ratio of the number of the group having a triple bond with respect to the number of all the terminals of the polyimide precursor is from 90 mol % to 100 mol %.

6. The polyimide precursor composition according to claim 1, wherein a weight average molecular weight of the polyimide precursor is from 50,000 to 200,000.

7. The polyimide precursor composition according to claim 1, wherein the polyimide precursor is a condensation polymer of an aromatic tetracarboxylic dianhydride and an aromatic diamine compound, a terminal of the condensation polymer being sealed by a compound which includes not only a group including a triple bond, but also a carboxy group or an amino group.

8. The polyimide precursor composition according to claim 2, wherein a ratio of the number of the group having a triple bond with respect to the number of all the terminals in the polyimide precursor is from 90 mol % to 100 mol %.

9. The polyimide precursor composition according to claim 1, wherein the solvent including water includes water in an amount of 50% by weight or more with respect to the entirety of the solvent.

10. A method of preparing a polyimide molded article, which comprises heating the polyimide precursor composition according to claim 1.

* * * * *